US007814132B2

(12) United States Patent
Shibata

(10) Patent No.: US 7,814,132 B2
(45) Date of Patent: Oct. 12, 2010

(54) FILE MANAGEMENT APPARATUS AND FILE MANAGEMENT METHOD

(75) Inventor: Koichi Shibata, Sakai (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1174 days.

(21) Appl. No.: 09/983,664

(22) Filed: Oct. 25, 2001

(65) Prior Publication Data

US 2002/0062321 A1    May 23, 2002

(30) Foreign Application Priority Data

Nov. 21, 2000  (JP) ............................. 2000-354876

(51) Int. Cl.
*G06F 12/00* (2006.01)
*G06F 15/16* (2006.01)

(52) U.S. Cl. ...................................... 707/822; 709/206
(58) Field of Classification Search ................. 707/200, 707/10, 1; 709/206
See application file for complete search history.

(56) References Cited

U.S. PATENT DOCUMENTS

| | | | | |
|---|---|---|---|---|
| 5,734,901 A * | 3/1998 | Sidhu et al. | .................. | 712/220 |
| 5,765,170 A * | 6/1998 | Morikawa | .................... | 707/200 |
| 5,781,901 A * | 7/1998 | Kuzma | ........................ | 707/10 |
| 6,023,700 A * | 2/2000 | Owens et al. | .................. | 707/10 |
| 6,094,277 A * | 7/2000 | Toyoda | ....................... | 358/1.15 |
| 6,175,857 B1 * | 1/2001 | Hachiya et al. | ............. | 709/206 |
| 6,275,850 B1 * | 8/2001 | Beyda et al. | ................ | 709/206 |
| 6,563,913 B1 * | 5/2003 | Kaghazian | ................ | 379/93.24 |
| 6,621,892 B1 * | 9/2003 | Banister et al. | .......... | 379/88.14 |
| 6,625,642 B1 * | 9/2003 | Naylor et al. | ............... | 709/206 |
| 6,671,355 B1 * | 12/2003 | Spielman et al. | ......... | 379/88.12 |
| 6,684,248 B1 * | 1/2004 | Janacek et al. | ............. | 709/225 |
| 6,687,742 B1 * | 2/2004 | Iwazaki | ...................... | 709/206 |
| 6,721,803 B1 * | 4/2004 | Kirkeby | ...................... | 709/246 |
| 6,771,382 B1 | 8/2004 | Misawa et al. | | |
| 6,931,592 B1 * | 8/2005 | Ramaley et al. | ............. | 715/209 |
| 7,032,030 B1 * | 4/2006 | Codignotto | ................. | 709/246 |
| 7,103,634 B1 * | 9/2006 | Ullmann et al. | ............. | 709/206 |
| 7,171,616 B1 * | 1/2007 | Berstis | ....................... | 715/205 |

(Continued)

FOREIGN PATENT DOCUMENTS

JP        6030208        2/1994

(Continued)

OTHER PUBLICATIONS

Japanese Office Action dated Jan. 23, 2008 (with English Translation).

*Primary Examiner*—Apu M Mofiz
*Assistant Examiner*—Cindy Nguyen
(74) *Attorney, Agent, or Firm*—Buchanan Ingersoll & Rooney PC

(57) ABSTRACT

A file management apparatus includes a receiver for receiving an electronic message having an attached file; a first acquirer for acquiring information concerning an original sender of the received electronic message; and a device for attaching the information concerning the original sender to the attached file. A file management method includes the steps of receiving an electronic message including information concerning an original sender of the electronic message and an attached file; acquiring the information concerning the original sender from the received electronic message; and attaching the information concerning the original sender to the attached file.

11 Claims, 8 Drawing Sheets

U.S. PATENT DOCUMENTS

| | | | |
|---|---|---|---|
| 7,596,606 B2 * | 9/2009 | Codignotto | 709/206 |
| 2001/0042093 A1 * | 11/2001 | Shirai et al. | 709/201 |
| 2002/0002482 A1 * | 1/2002 | Thomas | 705/10 |
| 2002/0059382 A1 * | 5/2002 | Yamaguchi et al. | 709/206 |

FOREIGN PATENT DOCUMENTS

| | | |
|---|---|---|
| JP | 11-110211 | 4/1999 |
| JP | 11-120247 | 4/1999 |
| JP | 2000-151891 | 5/2000 |

* cited by examiner

FIG. 4
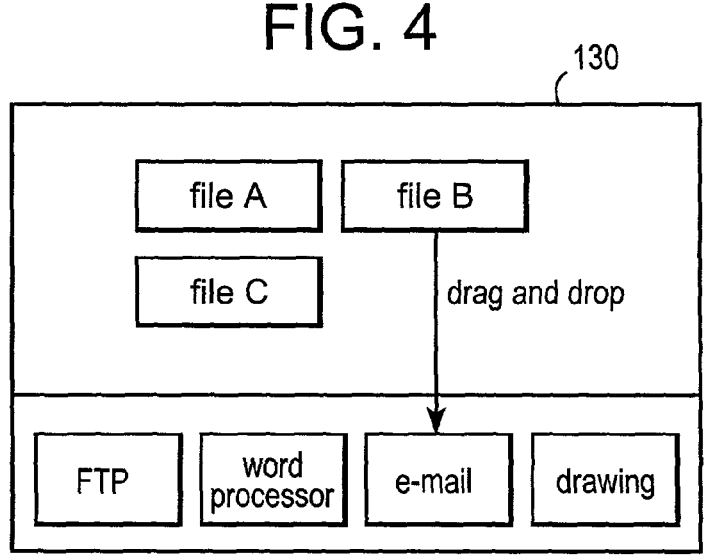
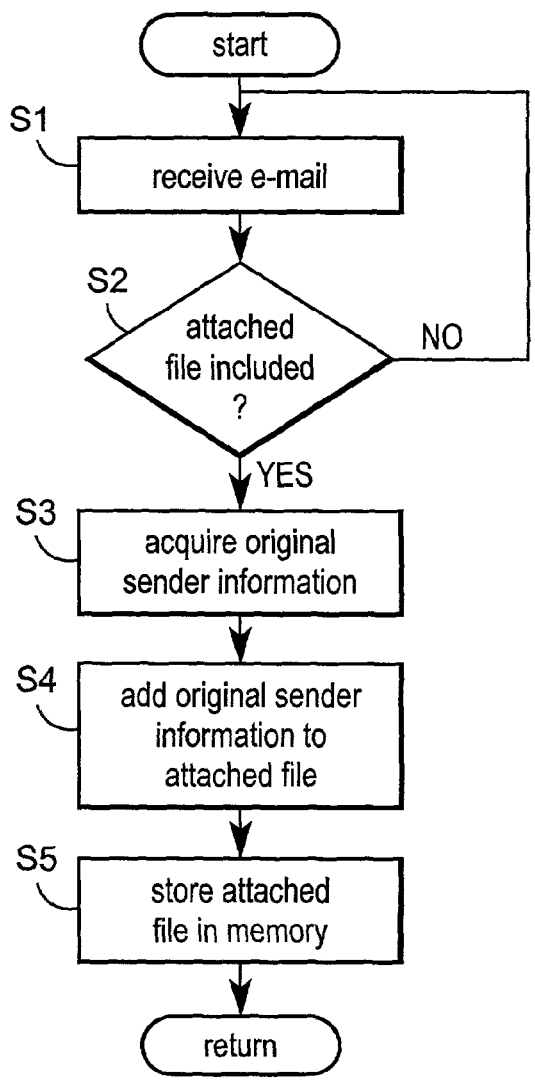
FIG. 5

FILE MANAGEMENT APPARATUS AND FILE MANAGEMENT METHOD

CROSS-REFERENCE TO RELATED APPLICATIONS

The present application claims the priority of Japanese Patent Application No. 00-0354876, filed in Japan on Nov. 21, 2000, the entire contents of which are hereby incorporated by reference.

BACKGROUND OF THE INVENTION

1. Technical Field to which the Invention Pertains

The present invention relates to a file management apparatus and a file management method, and in particular, to a file management apparatus and a file management method which manage a file that is attached to an e-mail.

2. Discussion of Related Art

In recent years due to the spread of the Internet, information exchange by means of e-mails has become frequent. E-mail is a function which makes possible an exchange of messages with one or a plurality of desired persons via a network such as the Internet. In order to transmit an e-mail, an e-mail address of the receiver is designated and the transmitted e-mail includes the e-mail address of the sender (originator). An e-mail can be transmitted with an image file or a file prepared with an application program attached to the message text.

As for a utilization method of such an e-mail, it is a frequent practice wherein after modifying a file attached to a received e-mail, the modified attached file is sent back to the original sender who sent the e-mail. In this case, the relationship between the attached file after modification and the original sender of the e-mail has been completely lost and, therefore, the e-mail address must be designated again at the time when the e-mail is sent back to the original sender. Accordingly, the designation of the e-mail address becomes an additional task and a problem arises that an e-mail address input error may occur at the time of the designation.

OBJECTS AND SUMMARY

This invention is provided to solve the above described problem and one purpose of this invention is to provide a file management apparatus and a file management method wherein it is possible to identify the origin of a file attached to electronic information such as an e-mail.

Another purpose of this invention is to provide a file management apparatus which makes it possible to accurately send an attached file that is attached to a received electronic information back to the e-mail address of the originator without the necessity of inputting an e-mail address in order to transmit electronic information such as an e-mail.

According to one aspect of this invention, a file management apparatus includes a receiver for receiving an electronic message having an attached file; first acquirer for acquiring information concerning an original sender of the received electronic message; and an attacher for attaching the information concerning the original sender to the attached file.

According to another aspect of the invention, the attacher adds the information concerning the original sender as a header to the attached file.

According to another aspect of the invention, the information concerning the original sender includes the original sender's address.

According to another aspect of the invention, the file management apparatus further comprises a designator for designating said attached file; a second acquirer for acquiring the original sender's address from the information attached to the attached file; and a transmitter for transmitting the attached file to the original sender's address.

According to another aspect of the invention, a file management method comprises the steps of receiving an electronic message including information concerning an original sender of the electronic message and an attached file; acquiring the information concerning the original sender from said received electronic message; and attaching the information concerning the original sender to the attached file.

According to another aspect of the invention, the attaching step includes adding the information concerning the original sender as a header to the attached file.

According to another aspect of the invention, the information concerning the original sender includes the original sender's address.

According to another aspect of the invention, the method further includes the steps of designating said attached file; acquiring the original sender's address from the information attached to the attached file; and transmitting the attached file to the original sender's address.

According to another aspect of the invention, a file management apparatus comprises a receiver for receiving an electronic message with an attached file; a recorder for recording information concerning the attached file and a sender of the electronic message in a database; a memory for storing the attached file; an identifier for subsequently identifying the attached file in the memory; a determinor for determining information concerning the sender of the electronic message from the database based on the identified attached file; and a transmitter for transmitting the identified attached file to the sender of the electronic message based on the determined information concerning the sender of the electronic message.

According to another aspect of the invention, a file management method comprises the steps of receiving an electronic message with an attached file; recording information concerning the attached file and a sender of the electronic message in a database; storing the attached file in a memory; subsequently identifying the attached file in the memory; determining information concerning the sender of the electronic message from the database based on the identified attached file; and transmitting the identified attached file to the sender of the electronic message based on the determined information concerning the sender of the electronic message.

BRIEF DESCRIPTION OF THE DRAWINGS

In the following, the embodiments of the present invention are described in reference to the drawings. Here, the same symbols in the drawings denote the same, or corresponding, members, of which the description is not repeated.

FIG. 4 is a diagram showing one example of a screen displayed on the display of the file management apparatus according to the first embodiment;

FIG. 5 is a flow chart showing the flow of e-mail reception processing carried out by the mailer program in the file management apparatus according to the first embodiment;

DETAILED DESCRIPTION OF THE PREFERRED EMBODIMENTS

Figure 1:
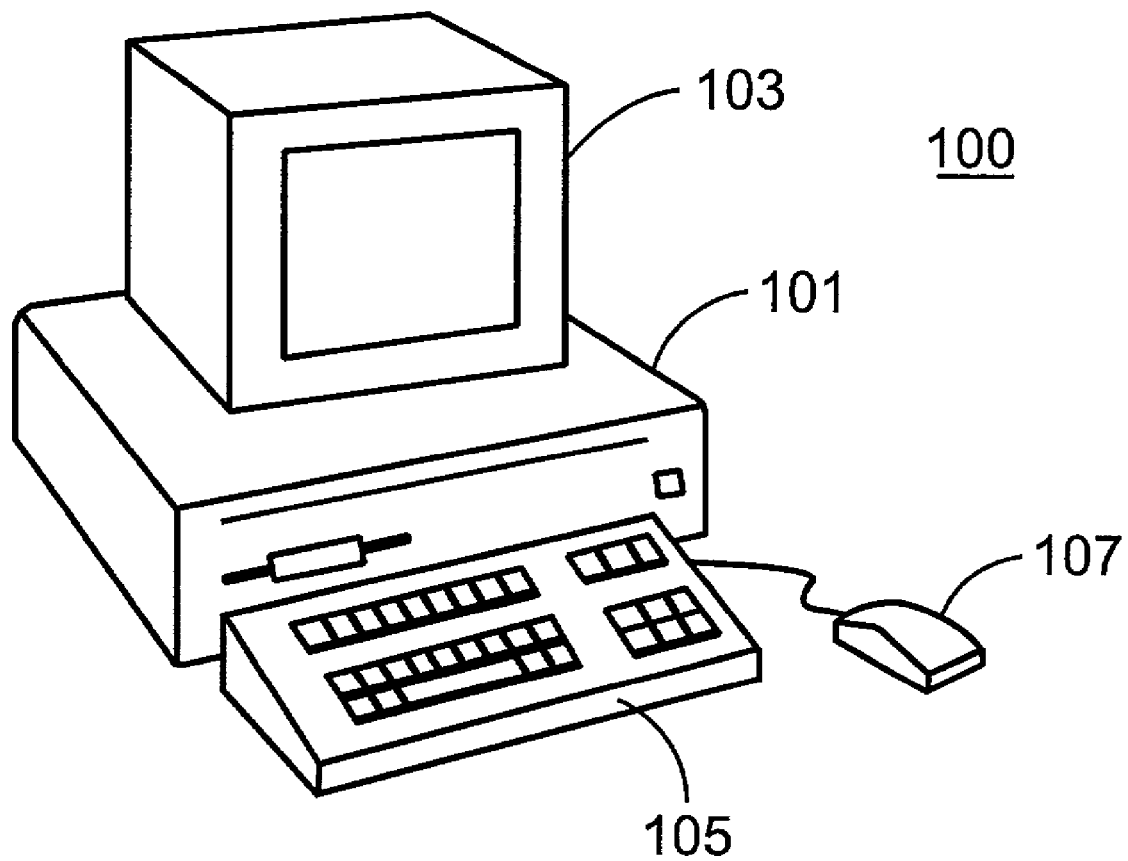
FIG. 1 is a perspective view showing the exterior appearance of a file management apparatus according to a first embodiment of the present invention.

FIG. 1 is a perspective view showing the exterior of a file management apparatus according to a first embodiment of this invention. A file management apparatus 100 can comprise a personal computer. The file management apparatus 100 includes a main body 101, a keyboard 105 which is connected to the main body, a mouse 107 and a display 103.

Figure 2:
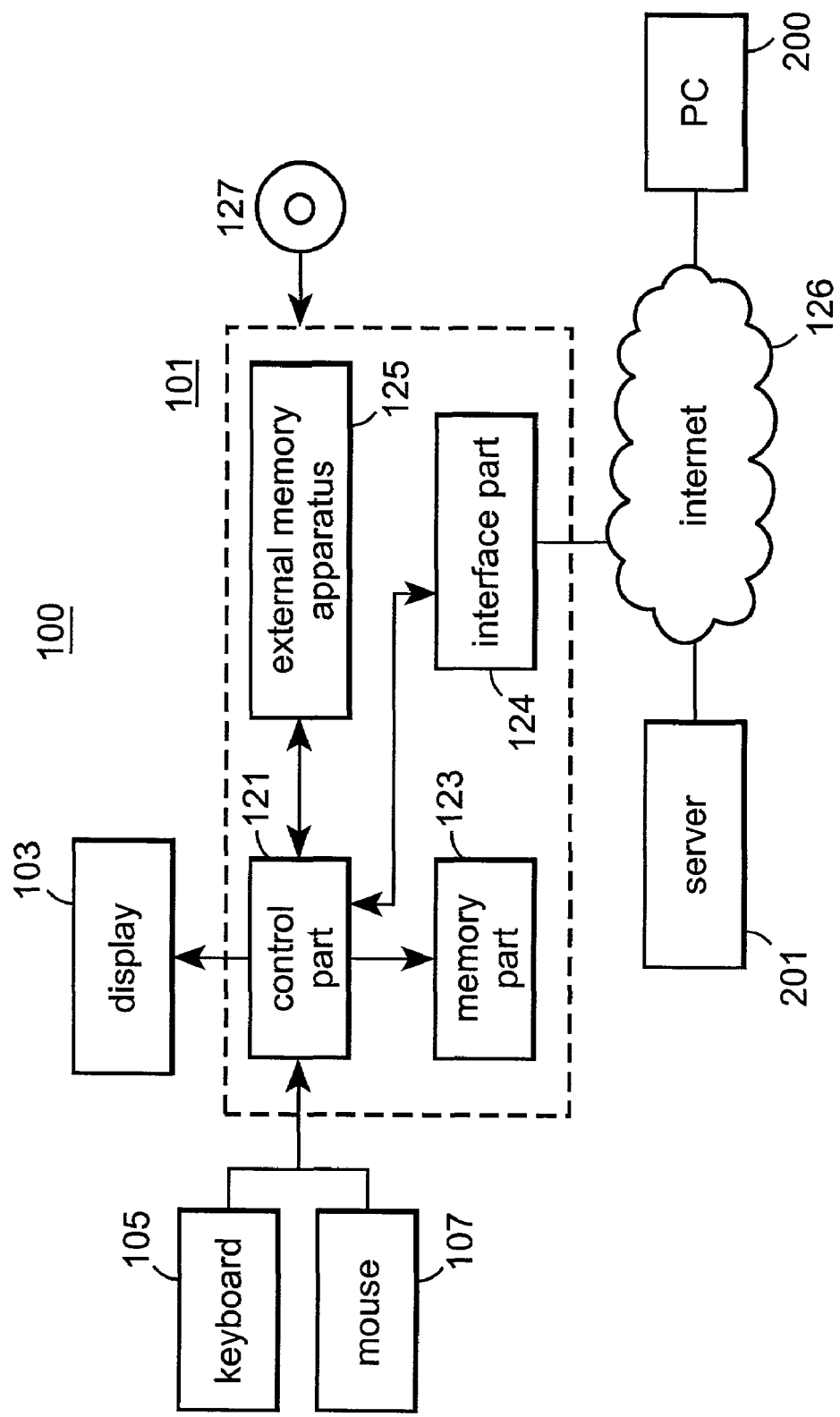
FIG. 2 is a block diagram showing a schematic configuration of the file management apparatus according to the first embodiment.

FIG. 2 is a block diagram showing a schematic configuration of the file management apparatus 100 of the first embodiment. In reference to FIG. 2, the file management apparatus 100 includes a control part 121 for controlling the entirety of the file management apparatus, a memory part 123 connected to the control part 121, an external memory apparatus 125 and an interface part 124. A display 103, a keyboard 105 and a mouse 107 are connected to the control part 121.

The memory part 123 is a magnetic recording apparatus such as a hard disc incorporated in the main body 101. In addition, an optical magnetic recording apparatus, or the like, may be used in place of the magnetic recording apparatus.

The external memory apparatus 125 is an optical magnetic memory apparatus, or the like, which can read out a program to be implemented in the control part 121 or a necessary data file from a recording medium 127, or which can write in data on the recording medium 127 according to the indication from the control part 121.

Here, as for a recording medium, tapes such as a magnetic tape or a cassette tape, discs such as a magnetic disc (flexible disc, hard disc) or an optical disc (CD-ROM/MO/MD/DVD, and the like), cards such as an IC card (including a memory card) or an optical card or a medium, such as a semiconductor memory, or the like, which statically holds a program, such as a mask ROM, an EPROM, an EEPROM or a flash memory can also be used. In addition, it may be a medium which holds a program in a fluid fashion such as a program downloaded from a network.

The contents stored in such a recording medium 127 are not limited to a program but, rather, may be data.

An interface part 124 is connected to the control part 121 and to the Internet 126. Thereby, another personal computer 200, or a mail server 201, which is connected to the Internet 126 is connected to the file management apparatus 100 through the Internet 126.

The file management apparatus 100 and the personal computer 200 can transmit and receive e-mail to and from each other through the mail server 201. Because of the connection through the mail server 201, even in the case that either the file management apparatus 100 or the personal computer 200 is not connected to the Internet 126, e-mail can be transmitted or received by connecting either of them to the mail server 201.

An e-mail includes, at least, a message text, an e-mail address of the receiver (recipient) and an e-mail address of the sender (originator). In addition, it is possible to attach an image file or a file prepared by means of an application program to an e-mail.

Here, though in the present embodiment, an example of utilizing the Internet as a network is shown, the network may be a network which makes data communication possible by means of a computer such as networks utilizing a public telephone line, a dedicated line or a wireless line in addition to a local area network (LAN), a wide area network (WAN), and the like.

In addition, though here an e-mail is described as an example, an information communication which directly transmits and receives a message via a computer network may be used between the file management apparatus 100 and the personal computer 200 without being routed through the mail server 201. In this case the transmitted data include the original sender's address, the receiver's address and the message text in the message and it is possible to add a file prepared by means of another application program. An IP address, for example, is used as the original sender's address and as the receiver's address.

Figure 3:
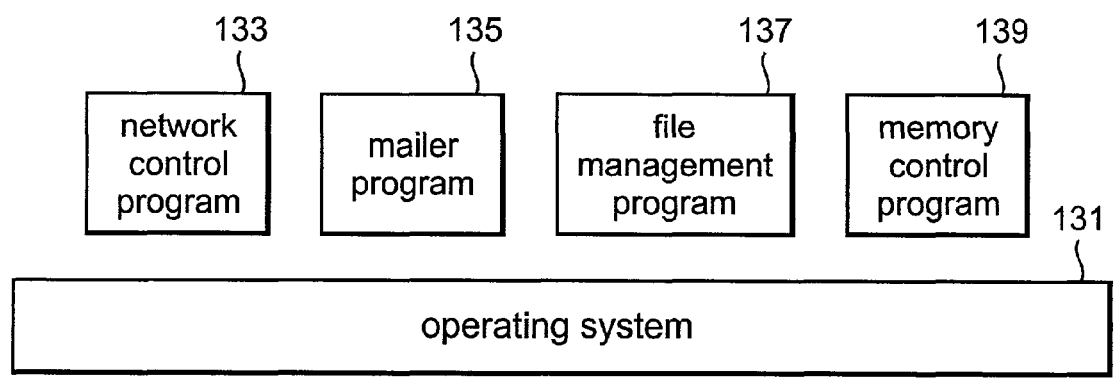
FIG. 3 is a software block diagram showing a configuration of a program carried out in the file management apparatus according to the first embodiment.

FIG. 3 is a software block diagram showing a configuration of a program which is carried out by the file management apparatus 100 in the first embodiment. In reference to FIG. 3, the file management apparatus 100 has an operating system 131 which includes, as a program to be carried out by the operating system 131, a network control program 133 for connecting the file management apparatus 100 to the Internet 126, a mailer program 135 for transmitting and receiving e-mail, a file management program 137 for managing a file stored in the memory part 123, and a memory control program 139 for controlling the memory part 123.

The network control program 133 controls the interface part 124 and connects the file management apparatus 100 to the personal computer 200 or to the mail server 201 via the Internet 126.

The mailer program 135 carries out the transmission and the reception of information to and from the network control program 133 and, thereby, carries out the transmission and reception of e-mail between the file management apparatus 100 and the personal computer 200 via the mail server 201.

The file management program 137 manages the file stored in the memory part 123. As for file management, the size, type, date of update, and the like, for example, of a file are recorded and the elimination or addition of a file is carried out.

The memory control program 139 is a program for controlling the memory part 123. The file management program 137 manages files of the memory part 123 via the memory control program 139.

FIG. 4 is a diagram showing one example of a screen displayed on the display of the file management apparatus according to the first embodiment. In reference to FIG. 4, the file management apparatus 100 comprises a graphic user interface (GUI). Three files A, B and C which belong to a certain folder are displayed as a thumbnail on the screen 130 displayed on the display 103.

A thumbnail is a small display of an image when data such as image files, or the like, are opened. In particular, it is difficult to estimate the contents of photographic data from a file title alone and, therefore, a thumbnail is displayed in a list format so as to make the operation of the file easier. Files displayed as thumbnails are not limited to image files but may be files prepared by means of a word processor program.

In addition, in the lower part of the screen 130 application programs are displayed as icons. Here, the application programs are assumed to be a file transmission program (FTP), a word processor program, a mailer program (email) and a drawing program. Icons corresponding to these programs are displayed.

Icons are letters, figures, symbols, or the like, represented in the form of a design which distinguishes types of application programs. Usually, a mouse pointer is placed on an icon of an application program and is double clicked with the mouse and, then, the application program on which the mouse pointer has been placed starts up. In addition, when a mouse pointer is placed on a thumbnail of a file so as to drag it and to drop it in an icon of the application, the application program of the icon in which the file is dropped starts up so that the dropped file is opened. For example, when a file B is dragged by a mouse and is dropped in the icon of the mailer program 135 (e-mail), the mailer program 135 starts up so as to display a screen for preparing an e-mail on the display 103. At this time, the file B is set as an attached file of the e-mail.

In this manner, since the file management apparatus 100 according to the first embodiment comprises the GUI, the start up of an application program or the selection of a file can be easily carried out.

FIG. 5 is a flow chart showing a flow of e-mail reception processing carried out by the mailer program in the file management apparatus according to the first embodiment. With reference to FIG. 5, the mailer program 135 first receives an e-mail (Step S1). Then, after receiving the e-mail it is judged whether or not an attached file is included in the received e-mail (Step S2). In the case that an attached file is included the procedure goes to Step S3, otherwise the procedure returns to Step S1. Then, in Step S3 information concerning the original sender of the received e-mail is acquired. The information concerning the original sender includes an e-mail address of the original sender and information included the email. Here, the information concerning the original sender is not limited to an email address, as long as it is information that can specify the person, such as the name of the original sender, user ID, or the like, and is included in an e-mail. A table which makes a correspondence between name, user ID and e-mail address may be prepared.

Next, the acquired information concerning the original sender is added to a header part of the attached file (Step S4). After that, the attached file is stored in a predetermined folder of the memory part 123 (Step S5).

Figure 6:
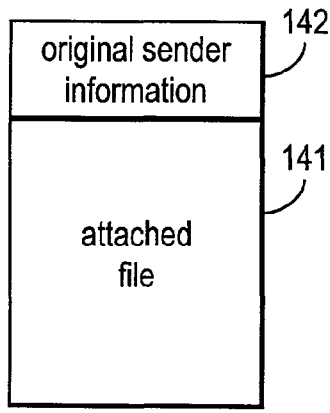
FIG. 6 is a diagram showing one example of a format of a file prepared by the mailer program in the file management apparatus according to the first embodiment.

FIG. 6 is a diagram showing an example of a format of a file prepared by the mailer program 135 in the file management apparatus 100 according to the first embodiment. In reference to FIG. 6, a header 142 is added to the added file 141 and the header 142 includes information concerning the original sender.

Figure 7:
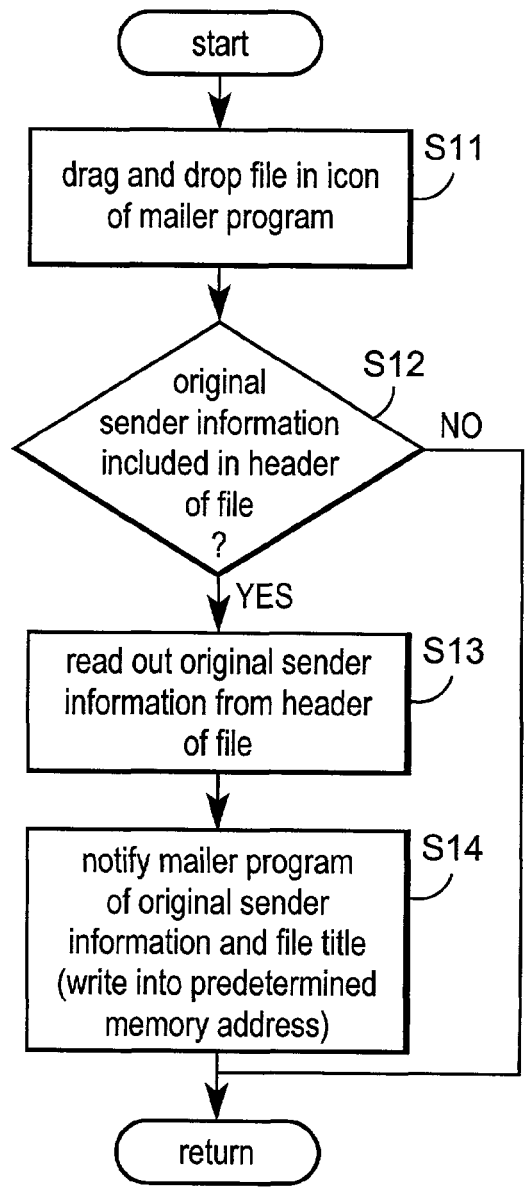
FIG. 7 is a flow chart showing the flow of file management processing carried out by the file management program in the file management apparatus according to the first embodiment.

FIG. 7 is a flow chart showing a flow of a file management process carried out by the file management program 137 in the file management apparatus 100 in the first embodiment. In this case, the file B is transmitted by means of email as an attached file on the screen 130, as shown in FIG. 4 as an example.

With reference to FIG. 7, the file management program 137 displays the screen 130 shown in FIG. 4 on the display 103 by using the GUI. When the user drags and drops file B in the icon (e-mail) of the mailer program 135, the mailer program 135 starts up (Step S11).

Next, it is judged whether or not the header of file B (electronic file) includes information concerning the original sender (Step S12). If there is information concerning the original sender, the procedure goes to Step S13, otherwise the process is completed. In Step S13, the information concerning the original sender is read out from the header part. The read out information concerning the original sender and the file title of file B are written into a specified memory address of a RAM of the control part 121 (Step S14). The mailer program 135 accesses this specified memory address of the RAM and, thereby, the mailer program 135 is notified of the information concerning the original sender and the file title of file B.

Here, in the first embodiment, the information concerning the original sender and the file title of file B are written into a specified memory address of the random access memory (hereinafter referred to as "RAM") of the control part 121. This memory address is defined by the mailer program 135. Alternatively, a specified region of the memory part 123 may be used or a register of the mailer program 135 may be used in place of the RAM of the control part 121.

Figure 8:
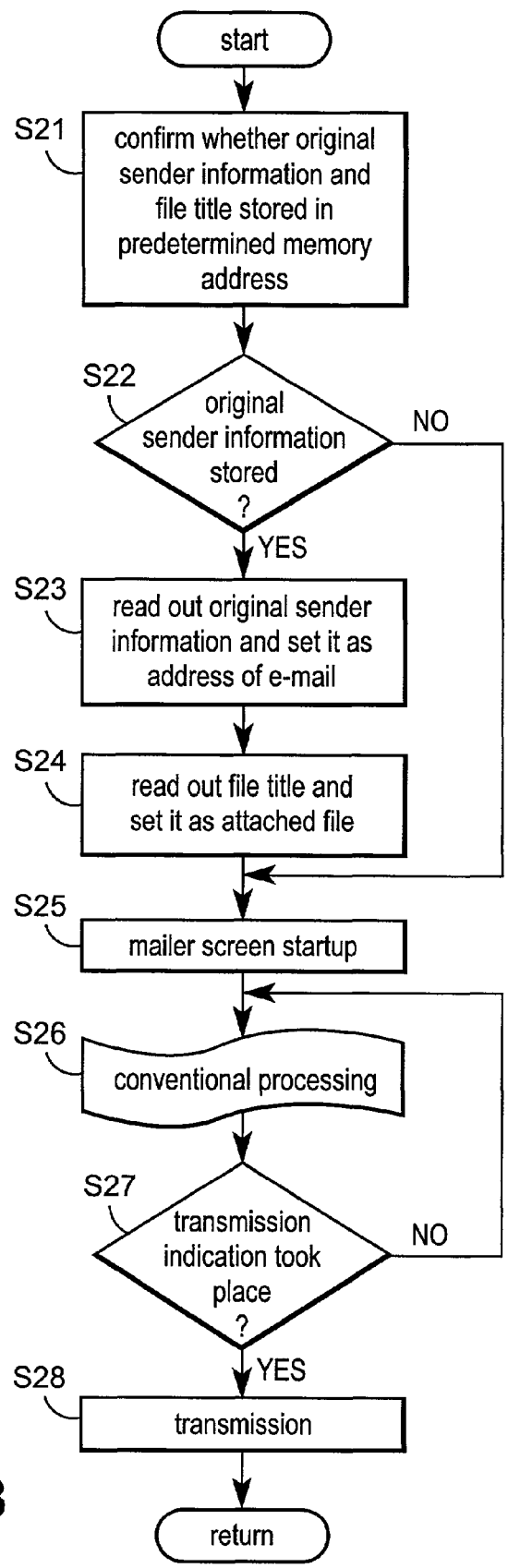
FIG. 8 is a flow chart showing the flow of e-mail transmission processing carried out by the mailer program in the file management apparatus according to the first embodiment.

FIG. 8 is a flow chart showing the flow of the processing of an e-mail transmission carried out by the mailer program 135 in the file management apparatus 100 according to the first embodiment. In reference to FIG. 8, the mailer program 135 first confirms whether or not information concerning the original sender and the file title are stored in a predetermined address of the RAM of the control part 121 (Step S21). Then, if the information concerning the original sender is stored, the procedure goes to Step S23, otherwise the procedure goes to Step S25 (Step S22).

In Step S23, the information concerning the original sender is read out and is set as an address of an e-mail. In the next Step S24 the file title is read out and is set as an attached file of an e-mail.

In Step S25, a predetermined mailer screen is started up for inputting a message text of an e-mail. In the next Step S26, conventional processing such as inputting a message text of an e-mail is carried out. Then, the judgment of whether or not a transmission instruction has taken place (Step S27) is shown on the mailer screen and in the case that a transmission instruction has taken place, the procedure goes to Step S28, otherwise the processing in Step S26 is carried out repeatedly.

In Step S28, a file with the file title received from the file management program 137 is set as an attached file and an e-mail is transmitted to the address of the received information concerning the original sender (Step S28).

As described above, in the file management apparatus according to the first embodiment, if an attached file is attached to the received e-mail, the e-mail address of the original sender of the e-mail is attached to the attached file when it is stored. Thus, every file can be correlated with the original sender when it is stored.

In addition, if a file that has been stored by correlation with information concerning the original sender is attached to an e-mail, the information concerning the original sender which has been correlated with the file is set at the receiver end of the e-mail, and a reply e-mail can be sent back to the e-mail address from which the file has been sent, without the necessity of inputting the address of the e-mail.

In addition, in order to correlate a file with information concerning the original sender of an e-mail, a header of the file is used and, therefore, it is not necessary to start up another program such as the file management program 137, or the like, at the time of receiving the e-mail. Therefore, the correlation can be carried out by the mailer program 135 alone.

In the file management apparatus according to the above described first embodiment, the information concerning the original sender is included in the header part added to the attached file. A file management apparatus according to a second embodiment correlates the information concerning the original sender with the file by means of a file management program 137. In this case, a management table which correlates the file with the information concerning the original sender is prepared by the file management program 137. In accordance with the file management apparatus according to the second embodiment, though a new processing for the preparation of a management table becomes necessary, files can be managed based on information concerning the original sender and, therefore, the effect is gained that it becomes convenient for a user to manage files. In this case, the processing carried out by the mailer program 135 is not different in any manner from the above described processing and the description thereof is omitted.

Figure 9:
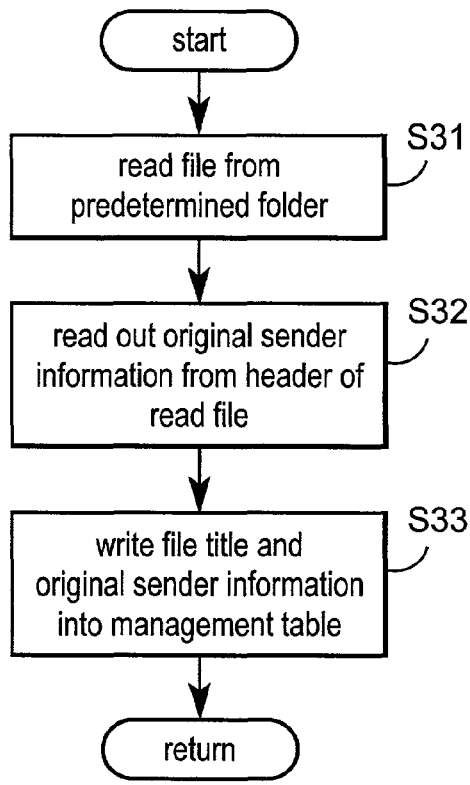
FIG. 9 is a flow chart showing the flow of processing for the preparation of a management table carried out by the file management program in the file management apparatus according to the second embodiment.

FIG. 9 is a flow chart showing the flow of the processing for the preparation of a management table carried out by the file management program 137 in the file management apparatus 100 according to the second embodiment. In reference to FIG. 9, the file management program 137 reads a file from a predetermined folder in which the mailer program 135 has stored an attached file (Step S31). Then, information concerning the original sender is read out from the header part of the read file (Step S32).

Then, the file title of the file read in Step S31 and the information concerning the original sender read out in Step S32 are written in to a management table (Step S33). The process from Step S31 to Step S33 is carried out for all of the files stored in the predetermined folder.

Here, the predetermined folder is set by the user of the file management apparatus 100 through an instruction by using a keyboard or a mouse.

Figure 10:
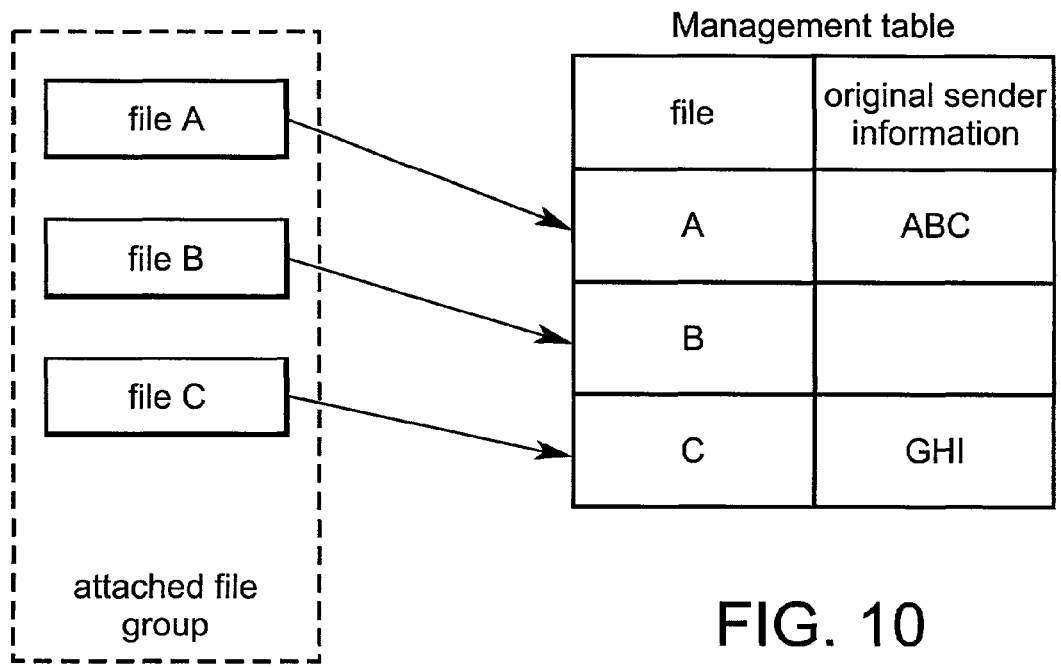
FIG. 10 is a diagram showing one example of a management table prepared through the processing for the preparation of a management table.

FIG. 10 is a diagram showing one example of a management table prepared through the processing for the preparation of a management table. In reference to FIG. 10, a management table is shown in the case that files A, B and C are stored in a folder. The file A is stored by correlation with the e-mail address "ABC" as information concerning the original sender while the file C is stored by correlation with an e-mail address "GHI" as information concerning the original sender. The reason why the file B is not correlated with information concerning the original sender is that no information concerning the original sender is attached to the header of the file B.

Figure 11:
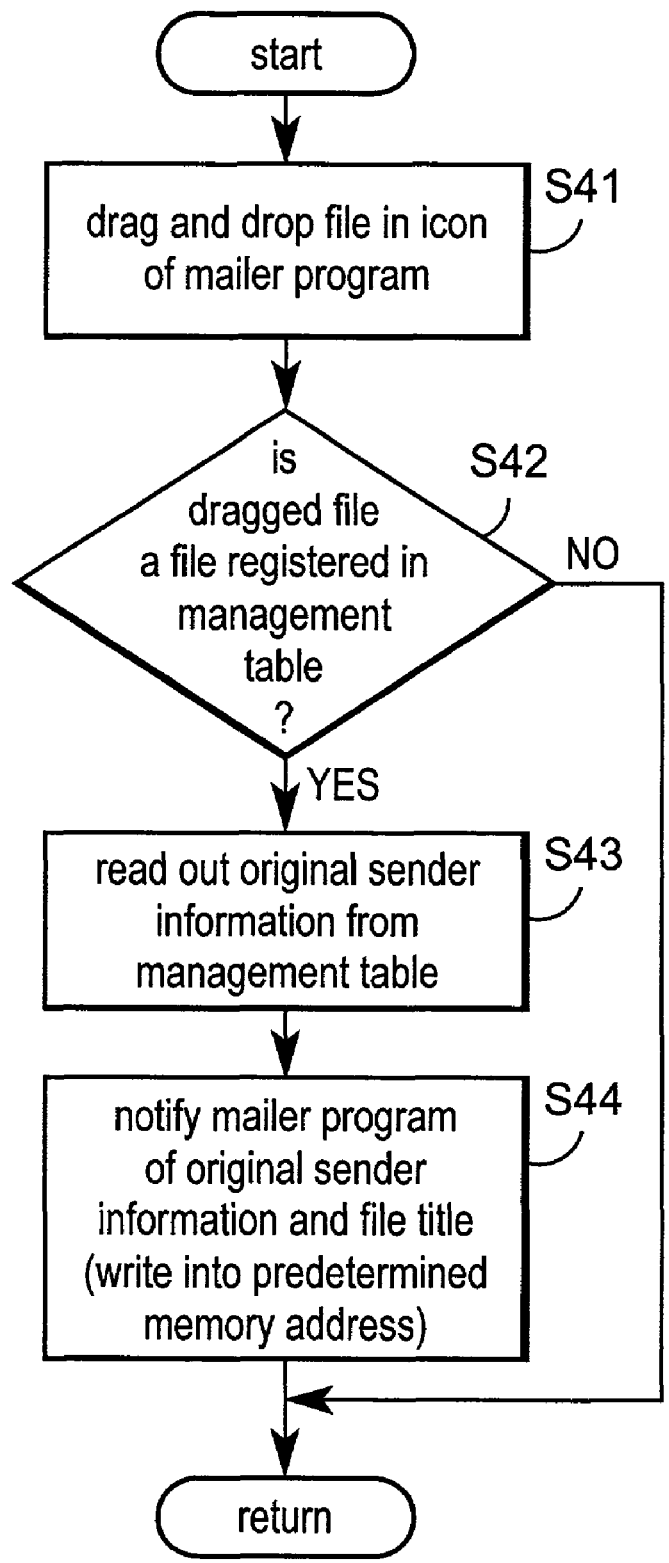
FIG. 11 is a flow chart showing the flow of file management processing carried out by the file management program in the file management apparatus according to the second embodiment.

FIG. 11 is a flow chart showing the flow of file management processing carried out by the file management program 137 in the file management apparatus 100 according to the second embodiment. In reference to FIG. 11, when a file is dropped into an icon of the mailer program 135 after being dragged, the mailer program 135 is started up (Step S41).

Then, it is judged whether or not the dragged file is an electronic file registered in the management table (Step S42). This is carried out by searching the management table according to the file title. If it is registered in the management table, the procedure goes to Step S43, otherwise the process is completed. Information concerning the original sender corresponding to the dragged file title is read out from the management table (Step S43). Then, the file title of the dragged file and the information concerning the original sender read out from the management table are written into a predetermined e-mail address of the RAM of the control part 121 (Step S44).

In this manner, the file management apparatus according to the second embodiment correlates a file with information concerning the original sender by using a management table and, therefore, a plurality of files can be managed with one table. Therefore, the search for a file becomes possible by making information concerning the original sender a search key.

Here, an attached file and information concerning the original sender may be correlated by means of the management table alone without adding, by means of a mailer program 135, the e-mail address of the original sender of an email to the attached file. Specifically, the processing according to the mailer program 135 is made to be the step of transmitting the information concerning the original sender and the attached file title acquired in Step S3 to the file management program 137 in place of Step S4 of FIG. 5. On the other hand, the file management program 137 prepares a table wherein attached file titles and information concerning the original sender are correlated. By transmitting and receiving information to and from the mailer program 135 and the file management program 137, a table which correlates an attached file attached to an e-mail with the original sender of the e-mail may be prepared.

Here, the processing carried out in the file management apparatus shown in the above can be implemented by allowing a computer to carry out the above described mailer program and file management program. The mailer program and the file management program may be installed in advance in the hard disc within a computer or may be recorded in a recording medium 127. In any case, the multiplying and file management program are recorded in a computer-readable recording medium.

The embodiments disclosed above should be considered as illustrative in all points and not limitative. The scope of the present invention is shown not by the above description but, rather, is shown by the claims so that the equivalent meaning of the claims and all modifications within the scope are intended to be included within the scope.

What is claimed is:

1. A file management apparatus comprising:
   a controller for controlling;
   a receiver for receiving an electronic message having an attached file;
   a first acquirer for acquiring information concerning an original sender of the previously received electronic message from the previously received electronic message;
   an attacher for attaching the information concerning the original sender that was acquired from the previously received electronic message to the attached file;
   wherein the information concerning the original sender includes the original sender's address;
   a designator for designating said attached file;
   a second acquirer for acquiring the original sender's address from the information attached to the attached file; and
   a transmitter for transmitting the attached file to the original sender's address.

2. The file management apparatus according to claim 1, wherein said attacher adds the information concerning the original sender as a header to the attached file.

3. A file management method, comprising the steps of:
receiving, by a receiver controlled by a controller, an electronic message including information concerning an original sender of the electronic message and an attached file;
acquiring, by an acquirer controlled by the controller, the information concerning the original sender from said previously received electronic message;
attaching, by an attacher controlled by the controller, the information concerning the original sender acquired from the previously received electronic message to the attached file;
wherein the information concerning the original sender includes the original sender's address;
designating said attached file;
acquiring the original sender's address from the information attached to the attached file; and
transmitting the attached file to the original sender's address.

4. The method of claim 3, wherein said attaching step includes adding the information concerning the original sender as a header to the attached file.

5. A computer readable storage medium containing a file management program which manages an attached file according to the steps of:
receiving an electronic message including information concerning an original sender of the electronic message and an attached file;
acquiring the information concerning the original sender from said previously received electronic message; and
attaching the information concerning the original sender acquired from the previously received electronic message to the attached file;
wherein the information concerning the original sender includes the original sender's address;
designating said attached file;
acquiring the original sender's address from the information attached to the attached file; and
transmitting the attached file to the original sender's address.

6. The file management program of claim 5, wherein the attaching step includes adding the information concerning the original sender as a header to the attached file.

7. A file management apparatus, comprising:
a receiver for receiving an electronic message with an attached file;
a recorder for recording information concerning the attached file and a sender of the previously received electronic message in a database, wherein the information is obtained from the previously received information;
a memory for storing the attached file;
an identifier for subsequently identifying the attached file in the memory;
a determinor for determining information concerning the sender of the previously received electronic message from the database based on the identified attached file; and
a transmitter for transmitting the identified attached file to the sender of the previously received electronic message based on the determined information concerning the sender of the previously received electronic message.

8. A file management method, comprising the steps of:
receiving an electronic message with an attached file;
recording information concerning the attached file and a sender of the previously received electronic message in a database, wherein the information is obtained from the received information;
storing the attached file in a memory;
subsequently identifying the attached file in the memory;
determining information concerning the sender of the previously received electronic message from the database based on the identified attached file; and
transmitting the identified attached file to the sender of the previously received electronic message based on the determined information concerning the sender of the previously received electronic message.

9. A computer readable storage medium containing a file management program that manages an attached file according to the steps of:
receiving an electronic message with an attached file;
recording information concerning the attached file and a sender of the previously received electronic message in a database, wherein the information is obtained from the received information;
storing the attached file in a memory;
subsequently identifying the attached file in the memory;
determining information concerning the sender of the previously received electronic message from the database based on the identified attached file; and
transmitting the identified attached file to the sender of the previously received electronic message based on the determined information concerning the sender of the previously received electronic message.

10. The file management apparatus of claim 1, further comprising a memory for storing the attached file which includes the information concerning the original sender.

11. The method of claim 3, further comprising storing, in a memory, the attached file which includes the information concerning the original sender.

* * * * *